United States Patent
Hanson et al.

(10) Patent No.: US 6,871,629 B2
(45) Date of Patent: Mar. 29, 2005

(54) REFRIGERATION SYSTEM WITH LOW-FUEL SHUTDOWN

(75) Inventors: Jay Lowell Hanson, Bloomington, MN (US); Thomas R. Sem, Minneapolis, MN (US); Steve Brenneman, Rockwall, TX (US); Ricardo Spiro DeGrego, Northfield, MN (US)

(73) Assignee: Thermo King Corporation, Minneapolis, MN (US)

( * ) Notice: Subject to any disclaimer, the term of this patent is extended or adjusted under 35 U.S.C. 154(b) by 283 days.

(21) Appl. No.: 10/209,294

(22) Filed: Jul. 30, 2002

(65) Prior Publication Data

US 2003/0070443 A1 Apr. 17, 2003

Related U.S. Application Data

(60) Provisional application No. 60/309,016, filed on Jul. 31, 2001.

(51) Int. Cl.[7] ............................................. F02B 77/00
(52) U.S. Cl. .............................. 123/198 C; 123/198 D
(58) Field of Search ....................... 123/198 C, 198 D, 123/198 DB, 198 DC; 62/323.1

(56) References Cited

U.S. PATENT DOCUMENTS

| | | | |
|---|---|---|---|
| 3,960,011 A | * 6/1976 | Renz et al. | ............ 73/116 |
| 4,124,013 A | 11/1978 | Rivalto | |
| 4,311,122 A | 1/1982 | Banba et al. | |
| 4,332,223 A | 6/1982 | Dalton | |
| 4,602,605 A | 7/1986 | Adkins | |
| 4,635,597 A | 1/1987 | Ohashi et al. | |
| 4,776,366 A | * 10/1988 | Czerwinski et al. | ........ 137/334 |
| 4,842,497 A | 6/1989 | Hafele et al. | |
| 4,930,550 A | * 6/1990 | Czerwinski et al. | ........ 137/334 |
| 4,960,088 A | 10/1990 | Havemann et al. | |
| 5,095,880 A | 3/1992 | Ricks | |
| 5,103,783 A | 4/1992 | Hanson et al. | |
| 5,201,186 A | 4/1993 | Hanson | |
| 5,222,368 A | 6/1993 | Hanson | |
| 5,454,229 A | 10/1995 | Hanson et al. | |
| 5,557,938 A | 9/1996 | Hanson et al. | |
| 5,706,779 A | 1/1998 | Hewitt | |
| 6,189,509 B1 | 2/2001 | Froment | |
| 6,220,311 B1 | * 4/2001 | Litto | ............ 141/67 |
| 6,253,741 B1 | 7/2001 | Channing | |
| 6,616,415 B1 | * 9/2003 | Renken et al. | ........ 417/44.1 |

* cited by examiner

*Primary Examiner*—John T. Kwon
(74) *Attorney, Agent, or Firm*—Michael Best & Friedrich LLP

(57) ABSTRACT

The present invention provides an apparatus and method of operating a refrigeration system. The apparatus and method includes providing a fuel pressure monitoring device that is disposed along a fuel line, automatically shutting down the engine if the fuel pressure meets a first condition, restarting the engine, and operating the engine in an unrestricted mode if the fuel pressure monitoring device records a second condition and shutting down the engine if the fuel pressure monitoring device does not record the second condition. An apparatus and method of operating a diesel engine of a refrigeration system that is coupled to an inline fuel injection system is also disclosed.

26 Claims, 4 Drawing Sheets

REFRIGERATION SYSTEM WITH LOW-FUEL SHUTDOWN

This application claims the benefit of prior filed co-pending provisional patent application No. 60/309,016 filed on Jul. 31, 2001.

BACKGROUND OF THE INVENTION

This invention relates to refrigeration systems and, more particularly, to fuel systems for refrigeration systems.

Refrigeration systems often incorporate a diesel engine to drive the compressor and blower components. Diesel engines operate by compressing a quantity of air in a cylinder and then injecting fuel into the compressed air. The heat of the compressed air spontaneously ignites the fuel, causing the cylinder volume to expand and drive a shaft.

A number of fuel injection systems are known to exist for introducing fuel into the cylinder in a diesel engine. In a distributor type injection system, a single injector pump and plunger mechanism move the fuel from the fuel filter to a distributor that distributes the fuel to the cylinders in proper sequence and time. In an inline-injection type system, each cylinder is associated with its own injection pump and plunger mechanism. A camshaft with a timing device drives the plungers and introduces fuel into the cylinders in the proper sequence and at the proper time.

Diesel engines can be difficult to start if the fuel line contains an excess of air. Air can get into the fuel line when the fuel level drops to the point where the fuel pump receives air. In this situation, the engine typically will not start until the air is removed from the fuel line. To do this, diesel fuel systems commonly include a mechanism for bleeding the air out of the fuel line.

Diesel fuel injection systems, particularly those with inline fuel injection systems, commonly do not exhibit symptoms of low fuel prior to air being drawn by the fuel pump. The engine typically will die suddenly, without exhibiting any fluctuations or erratic RPM levels. When the engine shuts down, the engine will already have drawn a large quantity of air into the fuel line, making it difficult to restart the engine. This problem is especially prevalent when the refrigeration system is used in connection with a truck trailer where the truck driver cannot constantly monitor the fuel level.

SUMMARY OF THE INVENTION

The present invention provides a method of operating a refrigeration system that includes a compressor driven by a diesel engine coupled to an inline fuel injection system, a fuel line connecting the fuel injection system to a fuel source, a fuel pump disposed along the fuel line for drawing fuel from the fuel source to the fuel injection system, and a fuel filter disposed along the fuel line. The method is designed to prevent the fuel pump from drawing excess air into the fuel line. The method includes providing a fuel pressure monitoring device disposed along the fuel line, automatically shutting down the engine if the fuel pressure monitoring device records a first condition, restarting the engine in a restricted mode, operating the engine in an unrestricted mode if the fuel pressure monitoring device records a second condition, and shutting down the engine if the fuel pressure monitoring device does not record the second condition.

The invention further yet provides a refrigeration system including a diesel engine, a compressor driven by the diesel engine, an inline injection system coupled to the diesel engine through a fuel line, a fuel source connected to the inline injection system via the fuel line, a fuel pump disposed along the fuel line for drawing fuel from the fuel source to the fuel injection system, a fuel filter disposed along the fuel line between the fuel pump and the inline injection system, a fuel pressure monitoring device disposed along the fuel line, a fuel solenoid operatively coupled to the inline injection system to selectively enable fuel to enter the engine, and a controller operatively coupled to the fuel pressure monitoring device and the fuel solenoid to receive an input from the fuel pressure monitoring device and control the fuel solenoid according to the input.

DETAILED DESCRIPTION

Figure 1:
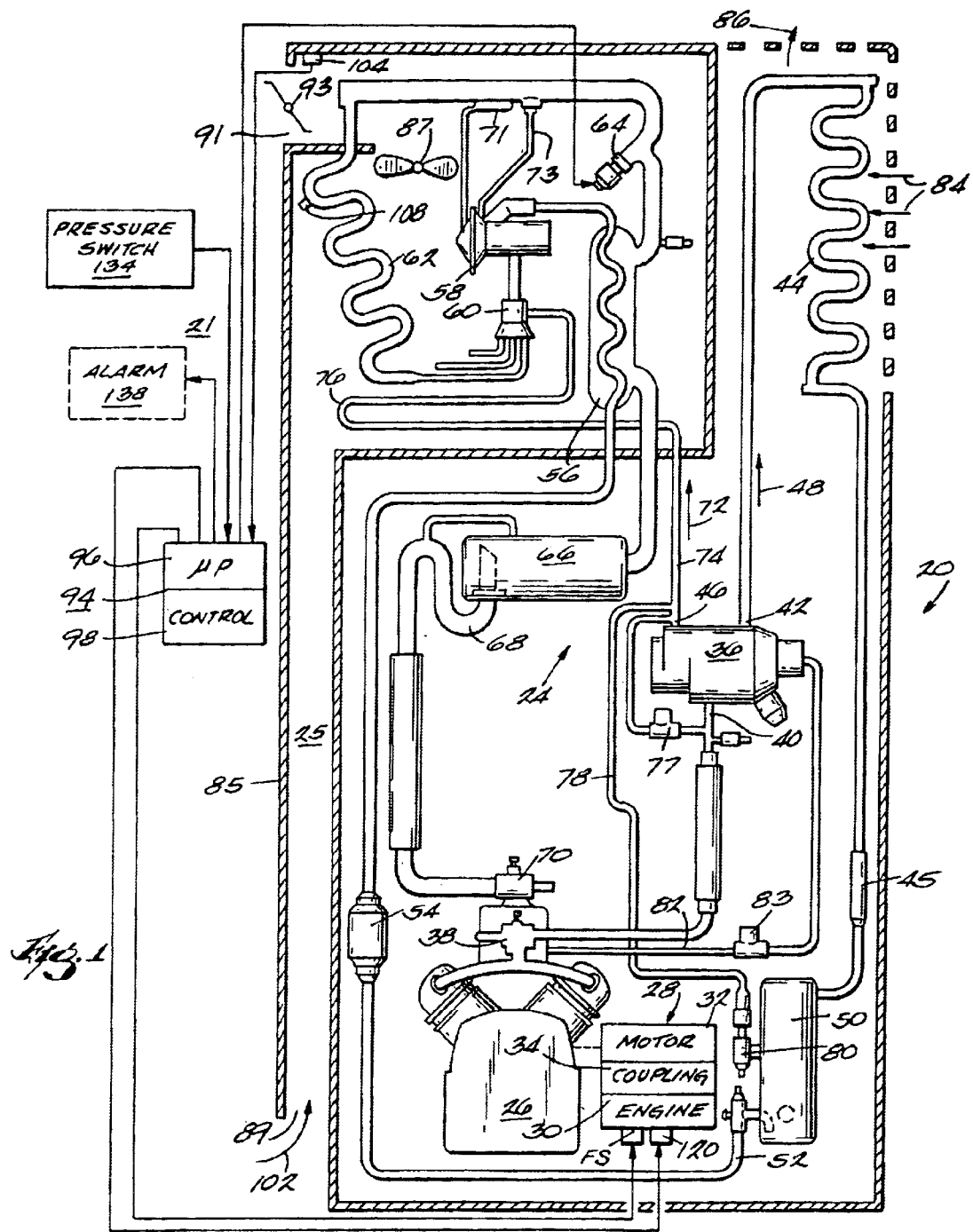
FIG. 1 shows a schematic diagram of a preferred embodiment of a refrigeration system according to the present invention.
Figure 2:
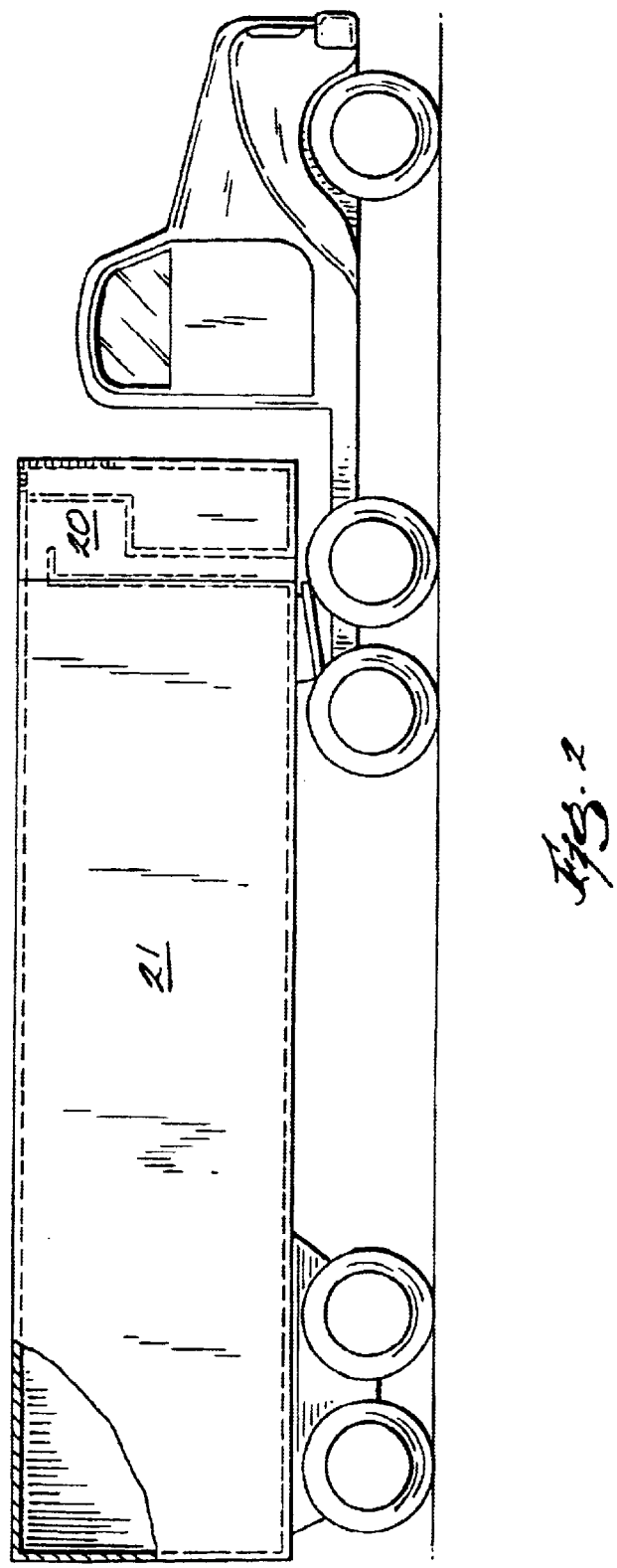
FIG. 2 shows the refrigeration system of FIG. 1 mounted to a truck trailer.

Referring to FIGS. 1 and 2, a preferred embodiment of a refrigeration system 20 utilizing the present inventive method and apparatus is illustrated and controls the temperature of a conditioned space 21 to a specified temperature range that includes a thermal set point. One of ordinary skill in the art will recognize that many refrigeration systems may utilize the present inventive method and apparatus and that the illustrated refrigeration system 20 is for illustrative purposes only. The refrigeration system 20 is especially suitable for use in transport applications, and may be mounted on a transport vehicle, such as, for example, a container, a truck, or a trailer.

The refrigeration system 20 has a closed fluid refrigerant circuit or flow path 24 that includes a refrigerant compressor 26 driven by a prime mover arrangement 28. The illustrated prime mover arrangement 28 includes an internal combustion engine 30 and an optional stand-by electric motor 32. The engine 30 and motor 32, when both are utilized, are coupled to the compressor 26 by a suitable clutch or coupling 34, which disengages the engine 30 while the motor 32 is operative.

Discharge ports of the compressor 26 are connected to an inlet port of a three-way valve 36 via a discharge service valve 38 and a hot gas line 40. The functions of the three-way valve 36, which selects heating and cooling cycles, may be provided by two separate valves, if desired. The three-way valve 36 has a first outlet port 42 that is selected to initiate a cooling cycle with the first outlet port 42 being connected to the inlet side of a condenser coil 44. The three-way valve 36 has a second outlet port 46 that is selected to initiate a heating cycle.

When the three-way valve 36 selects the cooling cycle outlet port 42, it connects the compressor 26 in a first refrigerant flow path 48, which includes the condenser coil 44, a one-way condenser check valve 45, a receiver 50, a liquid line 52, a refrigerant drier 54, a heat exchanger 56, an expansion valve 58, a refrigerant distributor 60, an evaporator coil 62, a compressor throttling valve 64, a second path through the heat exchanger 56, an accumulator 66, a suction line 68, and back to a suction port of the compressor 26 via a suction line service valve 70. The compressor throttling valve 64 may be replaced by a controllable suction line modulation valve, as taught by U.S. Pat. No. 4,977,751, which is assigned to the same assignee as the present application, to protect the operative prime mover against overload. The expansion valve 58 is controlled by a thermal bulb 71 and an equalizer line 73.

When the three-way valve 36 selects the heating cycle outlet port 46, it connects the compressor 26 in a second refrigerant flow path 72. The second refrigerant flow path 72 by-passes the condenser coil 44 and the expansion valve 58, connecting the hot gas output of the compressor 26 to the refrigerant distributor 60 via a hot gas line 74 and a defrost pan heater 76. A hot gas by-pass solenoid valve 77 may optionally be disposed to inject hot gas into the hot gas line 74 during a cooling cycle. A by-pass or pressurizing line 78 connects the hot gas line 74 to the receiver 50 via by-pass and check valves 80, to force refrigerant from the receiver 50 into an active refrigerant flow path during heating and defrost cycles.

A conduit or line 82 connects the three-way valve 36 to the low pressure side of the compressor 26 via a normally closed pilot solenoid valve 83. When the solenoid valve 83 is de-energized and thus closed, the three-way valve 36 is spring biased to select the cooling cycle outlet port 42. When the evaporator coil 62 requires defrosting, and when a load being conditioned in the conditioned space 21 requires heat to maintain thermal set point, the pilot solenoid valve 83 is energized and the low pressure side of the compressor 26 operates the three-way valve 36 to select the heating cycle outlet port 46 to initiate a heating cycle or a defrost cycle.

A condenser fan or blower (not shown), which may be driven by the prime mover arrangement 28, causes ambient air 84 to flow through the condenser coil 44, with the resulting heated air 86 being discharged to the atmosphere. A bulkhead 85 can preferably run the entire height of the load space 21, however, this is not necessary. A return air port 89 disposed at the bottom of the bulkhead 85 and a discharge air port 91 disposed at the top of bulkhead 85 define a return air path and discharge air path, respectively. An evaporator fan or blower 87, which also may be driven by the prime mover arrangement 28, draws return air through the return air port 89 and discharges conditioned cooled or heated air into the load space 21. A defrost damper 93 is disposed in the discharge air port 91 and may be closed during an evaporator defrost cycle.

A controller 94 controls the refrigeration system 20 and includes a microprocessor based controller 96, electrical control circuits and components 98, and a number of sensors, relays, solenoids, and the like. The microprocessor 96 can sample data collected at these temperature sensors at a rate of ten samples per second, however, other rates of sampling can be used and still be within the spirit and scope of the present invention. The microprocessor 96 also controls the throttling valve 64, the hot gas valve 77, and a throttle or high speed solenoid 120 that selects high and low operating speeds of engine 30.

Figure 3:
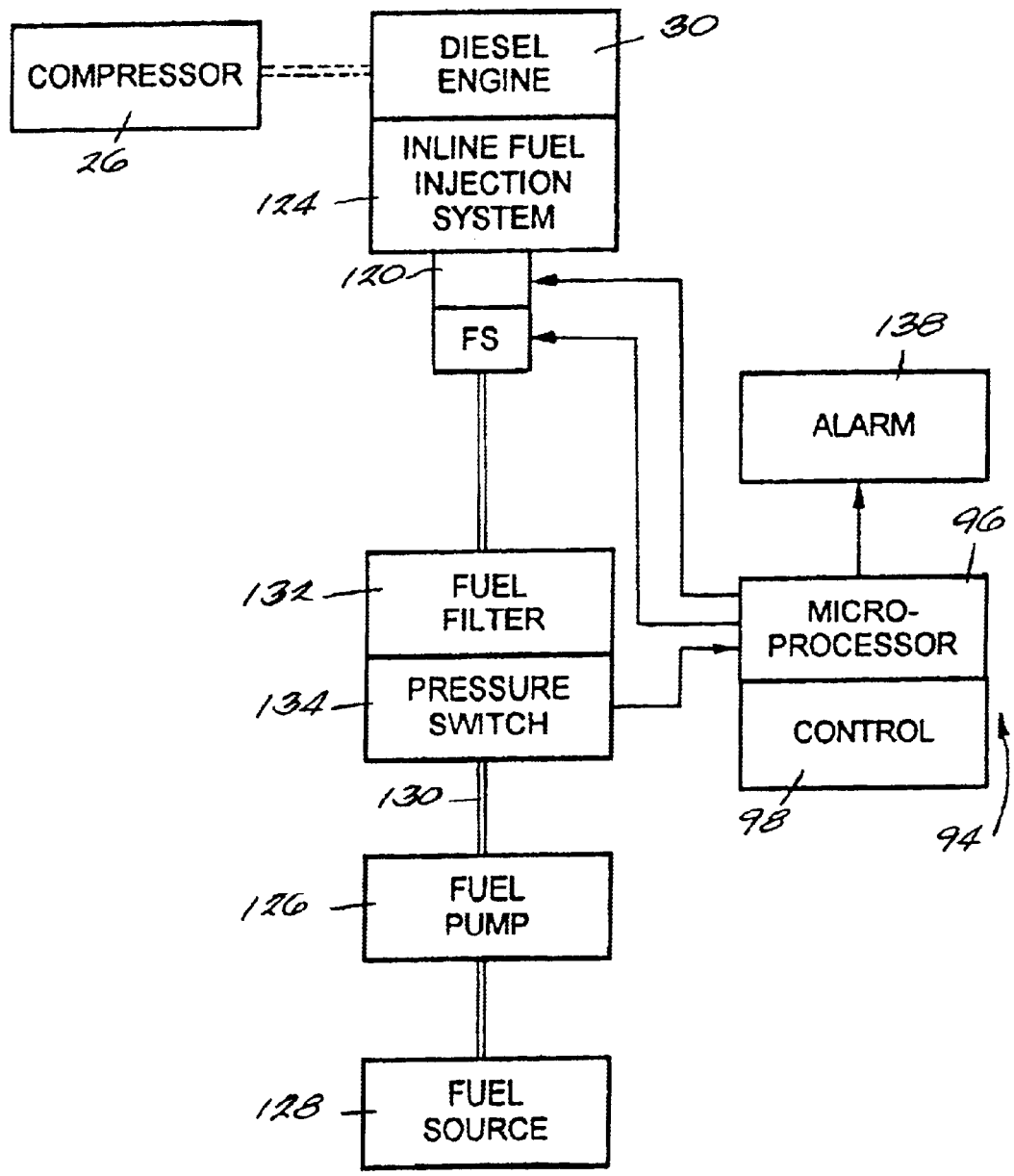
FIG. 3 shows a schematic diagram of the refrigeration system of FIG. 1.

Referring to FIG. 3, a preferred embodiment of the present invention is schematically shown. The compressor 26 is driven by the diesel engine 30, which is capable of operating at variable speeds, such as, for example, a low speed and a high speed. The low speed and high speed of the engine 30 is determined by the opening and closing of the throttle or high speed solenoid 120, which is operatively connected to the microprocessor 96.

Fuel is introduced into the cylinders of engine 30 by an inline fuel injection system 124. A fuel pump 126 supplies fuel to the fuel injection system 124 from a fuel source 128 via a fuel line 130. In a preferred embodiment when the fuel in the fuel source 128 is not low, fuel pressure in the fuel line 130 is around 12 psi when the engine 30 is operating at high speed and is around 7 or 8 psi when the engine 30 is operating in low speed. However, one of ordinary skill in the art will recognize that other operating parameters are suitable. A fuel filter 132 is disposed along the fuel line 130 between the fuel pump 126 and the fuel injection system 124. A pressure monitoring device or pressure switch 134 is preferably disposed at the inlet of fuel filter 132 and is operatively connected to the controller 94 comprising the microprocessor 96 and the electrical control 98. Although a pressure switch 134 is illustrated and described herein, any type of pressure monitoring device may be utilized and still be within the spirit and scope of the present invention. One of ordinary skill in the art will recognize that the pressure switch 134 can be disposed anywhere between the fuel pump 126 and fuel filter 132 to monitor fuel pressure. The illustrated microprocessor 96 is preferably a data acquisition sensor chip with at least one input and output receptor and capable of running delay and timer functions. In a preferred embodiment of the present invention, the microprocessor 96 runs a 15-second delay and a 2-minute timer function (discussed in greater detail below). However, the microprocessor 96 can run any delay or timer functions and still be within the spirit and scope of the present invention.

An alarm 138 and fuel solenoid FS are also operatively connected to the controller 94. An energized fuel solenoid FS enables the engine 30 to run and a de-energized fuel solenoid FS shuts the engine 30 down. In a preferred embodiment, the engine 30 runs in low speed when the fuel solenoid FS is energized. One of ordinary skill in the art will recognize that the controller 94 (including the microprocessor 96 and the electrical circuits and components 98), the pressure switch 134, the alarm 138, the fuel solenoid FS, and the throttle or high speed solenoid 120 can be utilized with any refrigeration system.

Figure 4:
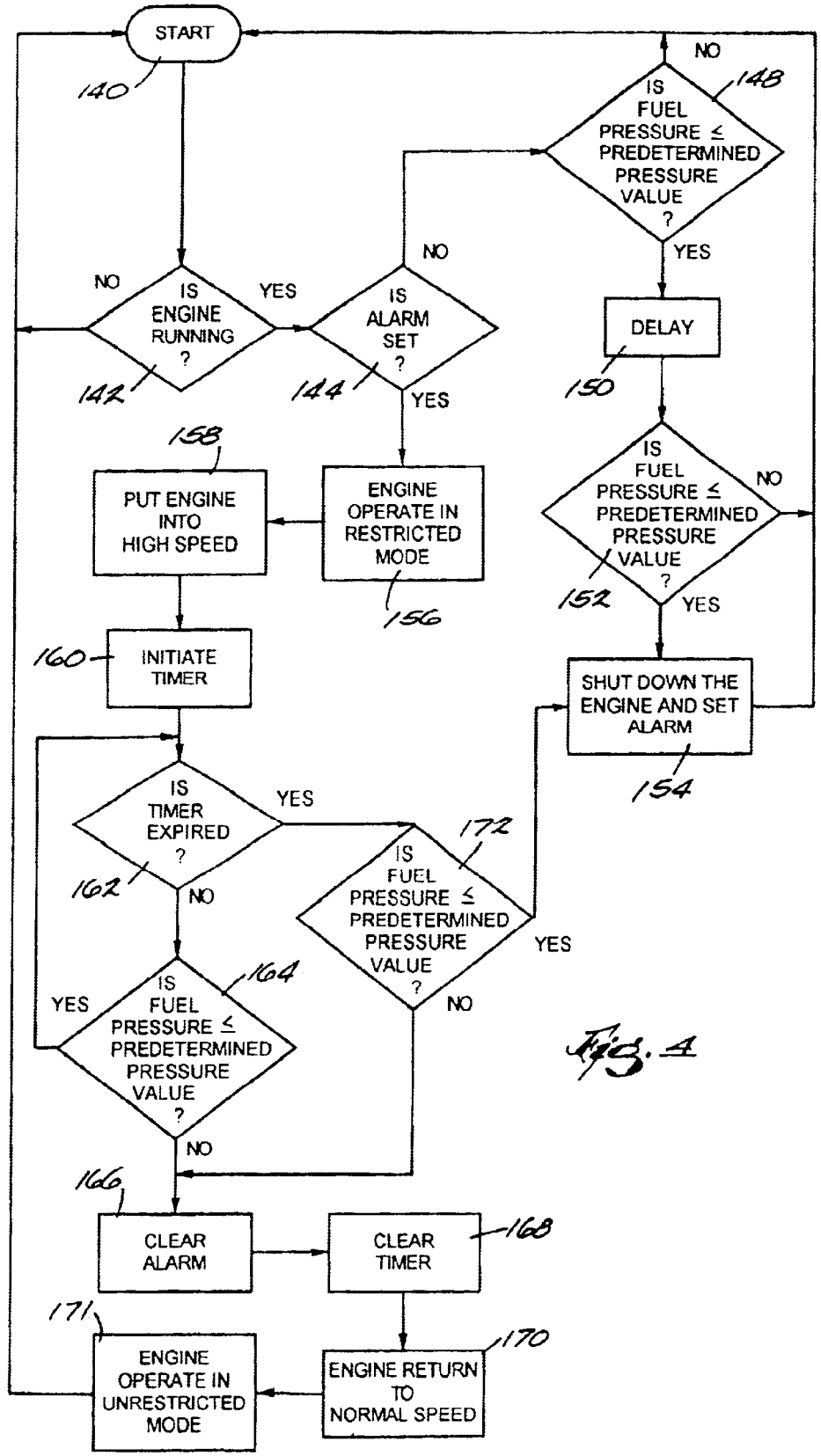
FIG. 4 shows a flow chart illustrating a preferred method in the form of a computer program that can be used to practice the present invention.

Referring to FIG. 4, a flow chart illustrating a preferred method in the form of a computer program that can be used to practice the present invention is illustrated. The program starts at block 140. From block 140, the program proceeds to block 142 where the program determines if the engine 130 is running. If the engine 130 is not running (NO at block 142), the program returns to block 140. If the engine 130 is running (YES at block 142), the program proceeds to block 144 where the program determines if the alarm 138 is set. If the alarm 138 is not set (NO at block 144), the program proceeds to block 148 where the program determines if the fuel pressure is less than or equal to a predetermined pressure value. In a preferred embodiment of the present invention, the predetermined pressure value is 2 psi, however, the predetermined pressure value can be any pressure value and still be within the spirit and scope of the present invention. If the fuel pressure is not less than or equal to the predetermined pressure value (NO at block 148), the program returns to block 140. If the fuel pressure is less than or equal to the predetermined pressure value (YES at block 148), the program proceeds to a delay at block 150. Upon the fuel pressure dropping below or equal to the predetermined pressure value, the pressure switch 134 closes and the delay initiates. In a preferred embodiment, the delay is about 15 seconds, however, the delay can be any period of time and still be within the spirit and scope of the present invention. From block 150, the program proceeds to block 152 where the program determines if the fuel pressure is less than or equal to the predetermined pressure value. If the fuel pressure is not less than or equal to the predetermined pressure value (NO at block 152), the program returns to start at block 140. The pressure switch 134 once again opens after the fuel pressure is above the predetermined pressure value. If the fuel pressure is less than or equal to the predetermined pressure value (YES at block 152), the program proceeds to block 154 where the engine 30 is shut down and alarm 138 is set. The controller 94 shuts down the engine 30 by de-energizing the fuel solenoid FS and sets the alarm 138 due to the low fuel pressure. From block 154, the program returns to start at block 140.

Referring back to block 144, if the alarm 138 is set (YES at block 144), the program proceeds to block 156 and the engine 30 is operating in a Restricted Mode. From block 156, the program proceeds to block 158 where the engine 30 is put into high speed operation. The engine is put into high be by the microprocessor 96 relaying a signal to the throttle or high speed solenoid 120 to open, therefore, allowing more fuel into the engine. High speed operation of the engine 30 is intended to bring the fuel pressure above the predetermined pressure value in a relatively short period of time. From block 158, the program proceeds to block 160 where a timer initiates. The timer provides a period of time in which the engine 30 can operate in high speed to bring the fuel pressure above the predetermined pressure value. In a preferred embodiment of the present invention, the timer is set for 2 minutes, however, the timer can be set for any period of time and still be within the spirit and scope of the present invention. From block 160, the program proceeds to block, 162, where the program determines if the timer is expired. If the timer is not expired (NO at block 162), the program proceeds to block 164 where the program determines if the fuel pressure is less than or equal to the predetermined pressure value. If the fuel pressure is less than or equal to the predetermined pressure value (YES at block 164), the program returns to block 162. If the fuel pressure is not less than or equal to the predetermined pressure value (NO at block 164), the program proceeds to block 166 where the alarm 138 is cleared. At this point, the fuel pressure has been raised to an acceptable pressure (above the predetermined pressure value) by the engine 30 and the alarm 138 is automatically cleared by the controller 94. From block 166, the program proceeds to block 168 where the timer is cleared. From block 168, the program proceeds to block 170 where the engine 30 returns to normal speed control. From block 170, the program proceeds to block 171 where the engine 30 operates in an Unrestricted Mode. In the Unrestricted Mode, the pressure switch 134 is open and the fuel solenoid FS is energized as long as the fuel pressure is greater than the predetermined pressure value.

Referring back to block 162, if the timer is expired (YES at block 162), the program proceeds to block 172 where the program determines if the fuel pressure is less than or equal to the predetermined pressure value. If the fuel pressure is not less than or equal to the predetermined pressure value (NO at block 172), the program proceeds to block 166 and continues therefrom in a manner similar to that discussed above. If the fuel pressure is less than or equal to the predetermined pressure value (YES at block 172), the program proceeds to block 154 and the engine 30 is shut down and the alarm 138 remains set. At any point when the engine 30 is shut down due to low fuel pressure, the transport vehicle operator, e.g. the truck driver, can enable restart the engine 30 while the system is in shut down, however, the transport vehicle operator cannot clear the alarm 138. The alarm 138 can only be cleared by the controller 94 after the fuel pressure rises above the predetermined pressure value within the period of time set into the timer. After the controller 94 clears the alarm 138, the engine 30 changes from operating in the restricted mode to operating in the unrestricted mode.

Although particular embodiments of the present invention have been shown and described, other alternative embodiments will be apparent to those skilled in the art and are within the intended scope of the present invention. Accordingly, it is intended that the invention should not be limited except as may be necessary in view of the appended claims.

What is claimed is:

1. A method of operating a refrigeration system, the refrigeration system comprising: a compressor driven by a diesel engine coupled to an inline fuel injection system; a fuel line connecting the fuel injection system to a fuel source; a fuel pump disposed along the fuel line for drawing fuel from the fuel source to the fuel injection system; and a fuel filter disposed along the fuel line, wherein the method is designed to prevent the fuel pump from drawing excess air into the fuel line, the method comprising:

providing a fuel pressure monitoring device disposed along the fuel line;

automatically shutting down the engine if the fuel pressure monitoring device records a first condition;

restarting the engine in a restricted mode; and operating the engine in an unrestricted mode if the fuel pressure monitoring device records a second condition; and shutting down the engine if the fuel pressure monitoring device does not record the second condition.

2. The method as claimed in claim 1, further comprising operatively connecting an alarm to the fuel pressure monitoring device and triggering the alarm if the fuel pressure monitoring device records the first condition.

3. The method as claimed in claim 2, further comprising resetting the alarm if the fuel pressure monitoring device records the second condition.

4. The method as claimed in claim 1, wherein the fuel pressure monitoring device is disposed in an inlet of the fuel filter.

5. The method as claimed in claim 1, wherein the fuel pressure monitoring device consists of a pressure switch.

6. The method as claimed in claim 1, wherein the fuel pressure monitoring device is a 2 psi pressure switch.

7. The method as claimed in claim 1, wherein the fuel pressure monitoring device records the first condition when the fuel pressure is equal to or below a predetermined pressure value for a first period of time.

8. The method as claimed in claim 1, wherein the fuel pressure monitoring device records the second condition when the fuel pressure exceeds a predetermined pressure value within a second period of time after the engine is restarted.

9. The method as claimed in claim 1, wherein the fuel pressure monitoring device records the first condition when the fuel pressure is equal to or below about 2 psi for about 15 seconds.

10. The method as claimed in claim 1, wherein the fuel pressure monitoring device records the second condition when the fuel pressure exceeds about 2 psi within about 2 minutes after the engine is restarted.

11. The method as claimed in claim 1, wherein automatically shutting down the engine further includes de-energizing a fuel solenoid.

12. The method as claimed in claim 1, wherein restarting the engine in the restricted mode further comprises energizing a fuel solenoid.

13. The method as claimed in claim 1, wherein restarting the engine in the restricted mode further comprises operating the engine in a restricted mode further includes operating the engine at high speed while the engine is operating in the restricted mode.

14. A method of operating a diesel engine of a refrigeration system, the engine being coupled to an inline fuel injection system, wherein a fuel line connects the fuel injection system to a fuel source, a fuel pump is disposed along the fuel line for drawing fuel from the fuel source to the fuel injection system, a fuel filter is disposed along the fuel line, and wherein the method is designed to prevent the fuel pump from drawing excess air into the fuel line, the method comprising:

A) providing a pressure switch along the fuel line;

B) automatically shutting down the engine if the fuel pressure meets a first condition;

C) enabling the engine to restart;

D) operating the engine in a restricted mode; and

E) allowing the engine to operate in an unrestricted mode if a second condition is met or shutting down the engine if the second condition is not met.

15. The method of claim 14 further comprising the step of operatively connecting an alarm to the pressure switch and triggering the alarm when the first condition is met.

16. The method of claim 15 further comprising the step of resetting the alarm if the second condition is met.

17. The method of claim 14 whereby the first condition is met when the fuel pressure is equal to or below a predetermined pressure value for a first period of time.

18. The method of claim 14 whereby the second condition is met when the fuel pressure exceeds a predetermined pressure value within a second period of time after the engine is restarted.

19. The method of claim 14 wherein the pressure switch is disposed in an inlet of the fuel filter.

20. The method of claim 14 wherein the pressure switch is a 2 psi pressure switch.

21. The method of claim 20 whereby the first condition is met when the fuel pressure is below about 2 psi for about 15 seconds.

22. The method of claim 20 whereby the second condition is met when the fuel pressure is at least about 2 psi within about 2 minutes after the engine is restarted.

23. The method of claim 14, wherein operating the engine in a restricted mode further includes operating the engine at high speed while the engine is operating in the restricted mode.

24. A method of operating a refrigeration system, the refrigeration system comprising a compressor driven by a diesel engine coupled to an inline fuel injection system; a fuel line connecting the fuel injection system to a fuel source; a fuel pump disposed along the fuel line for drawing fuel from the fuel source to the fuel injection system; and a fuel filter with an inlet disposed along the fuel line, wherein the method is designed to prevent the fuel pump from drawing air into the fuel line, the method comprising:

providing a pressure switch at the inlet of the fuel filter;

shutting down the engine if the fuel pressure is equal to or below approximately 2 psi for a first period of time;

operatively connecting an alarm to the pressure switch and triggering the alarm if the fuel pressure is equal to or below approximately 2 psi for the first period of time;

enabling the engine to be restarted and operate in a restricted mode; and enabling the engine to operate in an unrestricted mode if the fuel pressure exceeds approximately 2 psi within a second period of time of the engine restarting or shutting the engine down if the fuel pressure does not exceed approximately 2 psi within the second period of time after the engine is restarted.

25. The method of claim 24, wherein the first period of time is about 15 minutes.

26. The method of claim 24, wherein the second period of time is about 2 minutes.

* * * * *